Jan. 21, 1941.          J. A. BRANTLEY                  2,229,548
                        SAW TESTING DEVICE
                        Filed Sept. 27, 1939
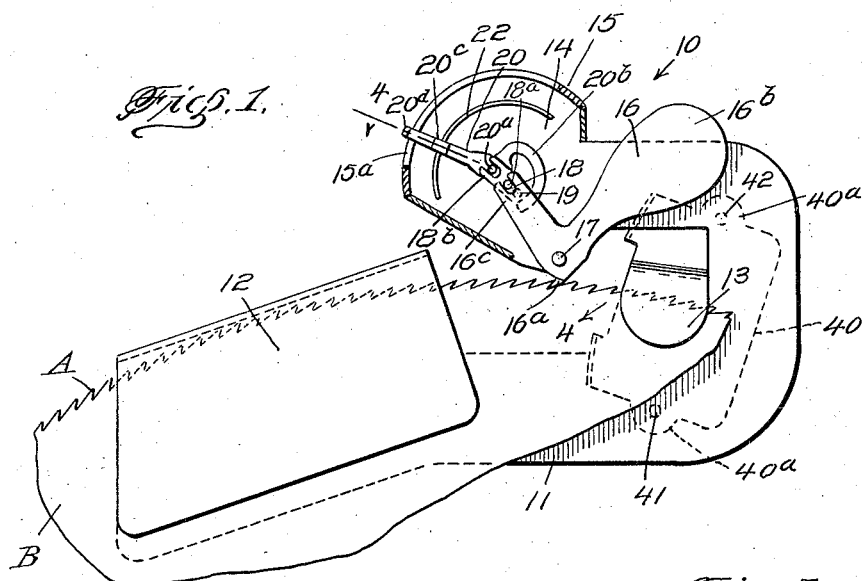
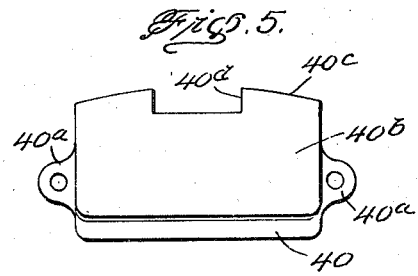
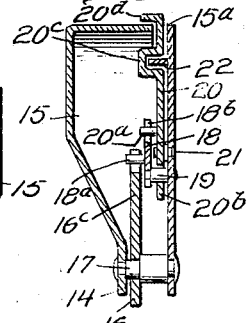
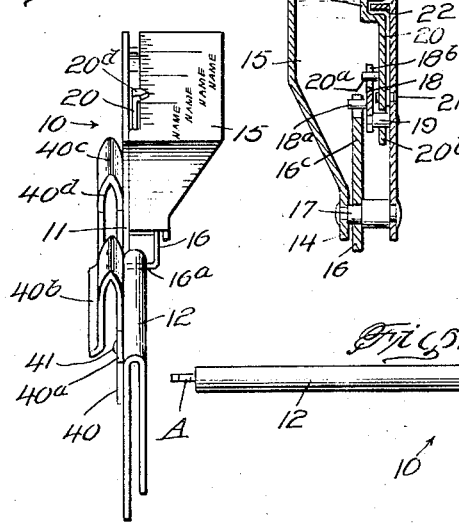
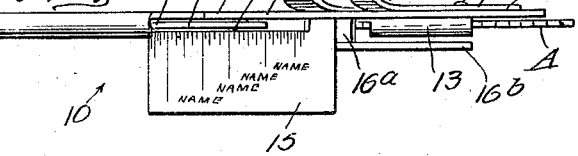
John A. Brantley, INVENTOR
BY Victor J. Evans & Co.
ATTORNEYS Patented Jan. 21, 1941

2,229,548

UNITED STATES PATENT OFFICE 2,229,548

SAW TESTING DEVICE

John A. Brantley, Texarkana, Ark., assignor of seventy-five per cent to Macon (Luetta) Jarvis, Texarkana, Tex.

Application September 27, 1939, Serial No. 296,859

2 Claims. (Cl. 33—202)

This invention relates to improvements in devices for testing saws especially for determining the pitch of teeth in a saw of the type used in cotton gin for picking lint from cotton bolls.

By the expression "pitch" as used in this specification and in the claims subjoined thereto is meant the angle determined by the lead face of a saw tooth intersecting the radius in the instance of a circular saw, or intersecting a line perpendicular to the axis of motion in other types of saws. The pitch of a saw usually is determined in arbitrary units instead of those units by which angles commonly are measured.

It is an object of the present invention to provide a rugged structurally simple device for measuring with facility and accuracy the pitch of saw teeth, the device constituting an improvement upon existing types of saw testing devices in that it includes motion magnifying means whereby small variations in pitch of the saw teeth being tested are disclosed by relatively large variations in reading of display means coupled to the device.

An advantage of the novel device according to the present invention is that it includes no resilient acting members and hence the device is not subject to being rendered inoperative by fatigue and break down of springs and the like as is the case with similar devices now in use.

A feature of the novel testing device according to the present invention is the ease with which it can be used in examining relatively large numbers of teeth in short periods of time, or, in other words, it may be said that the device while functioning with accuracy is nevertheless suited to rapid testing.

Another feature of the device according to this invention important from the standpoint of manufacturing the same is that the elements thereof may be formed by relatively simple mechanical operations or transactions on automatic machinery with the result that the advantages of mass production can be substantially fully realized with resultant lowering of the cost of the device. The structural ruggedness of the device also tends to minimize likelihood of need of repair under conditions of normal use.

Other objects, advantages and features of the new and improved saw testing device according to the present invention will be apparent to those skilled in this art during the course of the following description.

Regarded in certain of its broader aspects the novel saw testing device according to the present invention comprises a first member adapted to be in position upon the points of saw teeth and, movably mounted upon said first member, a second member adapted to rest against an edge of one of the saw teeth together with moving display means operated by relative motion of said members.

In order to facilitate a fuller and more complete understanding of the present invention a specific embodiment thereof herein illustrated will be hereinafter described, it being clearly understood, however, that the illustrated embodiment, although presently preferred, is provided solely by way of example of the practice of this invention and not by way of limitation thereof except insofar as the invention is recited in the subjoined claims.

Referring then to the drawing,

Figure 1 is substantially a side elevational view of the presently preferred embodiment of the instant invention showing same in testing position upon a fragment of a circular saw, parts of the casing of the device being removed to expose interior structure;

Fig. 2 is essentially an end elevational view of the device shown in Fig. 1;

Fig. 3 is substantially a top plan view of the device shown in the foregoing figures;

Fig. 4 is substantially a horizontal sectional view of Fig. 1 taken along the line 4—4 thereof, Fig. 5 is substantially a side elevational view of an auxiliary testing device, and Fig. 6 is an end view of the same.

Referring now especially to Figs. 1 to 4 inclusive, it will be noted that the novel testing device according to the present invention generally designated by the numeral 10 comprises a frame 11 provided with a channeled end portion 12 formed by turning over parts of the frame, which is suited to receive and rest upon the tips of the teeth A of the saw blade B. An overturned lug 13 also is adapted upon occasion to rest around the edge of the saw B for purposes of supporting the device. The lug also serves at holding the device in alignment upon the saw blade during testing as hereinafter more clearly will be apparent.

The opposite end 14 of the frame 11 is provided with overturned marginal portions 15 defining a chamber or casing wherein display mechanism is mounted as will be hereinafter described. A bell crank lever 16 mounted on the pin 17 is provided with an extending tooth engaging member 16a formed integral with the lever arm and located beneath the pivotal mounting thereof. It is to be noted that a tooth engaging portion 16a of the lever arm includes a substantially flat surface adapted to rest against the face of one of the saw teeth being so positionable by motion of the bell crank lever. Motion of the bell crank lever is facilitated by the outwardly extending arm 16b thereof which projects somewhat beyond the frame 11, serving as a counterweight.

One end 16c of the bell crank lever is bifurcated to receive and engage with the pin 20a mounted on the pointer arm 20, the last mentioned being pivotally mounted on the supporting pin 21 attached to parts of the casing. The arm 20 is looped laterally as indicated by the reference character 20c around portions of the arcuate dust stop 22 mounted on side portions of the casing and the end portion 20d of the arm 20 which projects outwardly through the opening 15a in the casing 15 is bent against the casing side and provided with a pointed end for facilitating comparison of a scale upon the casing side read in relation to the end 20d of the pointer arm 20. It will be obvious that the purpose of the arcuate member 22 is to inhibit the passage of dust and the like through the opening 15a onto the moving parts of the mechanism. A weighted curved arm 20b integrally formed with the pointer arm 20 is provided to read the pointer at rest position, that is to say to move the index to zero reading on the scale.

It is believed that it will be obvious from consideration of the drawing, especially Figs. 1 and 4, that the connector arm 18 serves to magnify motion of the bell crank lever 16, that is to say, relatively minor motion of the bell crank lever will result in relatively major motion of the outer end of the pointer arm 20.

The device according to the present invention includes an auxiliary testing unit for checking teeth outlines of saws being tested, this device being mounted upon the rear of the frame 11 and being designated by the reference character 40. Referring especially to Figs. 5 and 6 wherein details of the auxiliary testing device best are illustrated, it will be noted that it comprises a plate having laterally extending lugs 40a by which the device can be attached to the frame 11 with appropriate fastening means 41, and an overturned lip 40b, the bent portion of the plate joining the lip to the body of the device but curved as indicated at 40c and being cutaway as indicated at 40d. The channel between the main body of the plate 40 and the lip 40b is internally carefully formed to define a recess 40e corresponding in cross sectional outline to the preferred outline of saw teeth being tested.

The device is used as follows: The overturned portion 12 of the framework 11 and the lug 13 are positioned upon peripheral parts of the saw and by manipulation of the lever arm 16, preferably by moving the end portion 16b thereof, the tooth engaging portion 16a of the lever arm is moved into the position illustrated in Fig. 1 whereby the flat edge of said portion of the arm rests against the flat side of the saw tooth. When so positioned the relation of the pointer end 20d to the scale carried upon the casing 15 is noted. The scale of course is calibrated by testing of standard saws whereby variations from standard can be determined by application of the device. It is important of course that the flat surface of the tooth engaging portion 16a of the lever arm 16 rests firmly and exactly against the flat edge of the tooth, but experience indicates that in operation of the device this condition easily is attained.

In testing the tooth outline a portion of the saw is positioned between the body of the plate 40 for the overturned lip 40b thereof, and as the device is moved along the saw the edges of the teeth are examined through the opening 40d to determine whether or not they conform with the standard contour defined by the recesses between the plate and lip as above described.

Experience indicates that especially in cotton gins and the like are the testing of tooth pitch and tooth outline important inasmuch as small variations in the same frequently are reflected in large variations in gin output. For these reasons then the testing apparatus according to the present invention has especial application to use in testing devices of this character because both of the facility with which the tests may be conducted and also the accuracy of the measurements obtained.

It is to be understood of course that this invention is capable of extended application and is not confined to the precise illustrated forms nor described construction and, therefore, such changes and modifications may be made therein as do not affect the spirit of the invention nor exceed the scope of the appended claims.

Having thus described the present invention, what it is desired to secure by Letters Patent is:

1. A device for testing circular saws comprising a frame having a channeled portion for resting upon edge parts of a saw; a swinging arm pivoted to said frame, a transversely extending lug on said arm having a flat side portion adapted to rest between two saw teeth and against an edge of one of said teeth whereby the position of said arm relative to said frame is related to the pitch of the saw tooth against which said lug rests; a scale carried on said frame; a pivotally mounted index sweeping said scale; and means coupling said index and said arm whereby the position of the index relative to the scale is related to the pitch of the saw being tested.

2. A device for testing circular saws comprising a frame having a channeled portion for receiving and resting tangentially upon peripheral edge parts of a saw; a swinging arm pivoted to said frame, a transversely extending lug on said arm having a flat side portion adapted to rest between two saw teeth and against an edge of one of said teeth whereby the position of said arm relative to said frame is related to the pitch of the saw tooth against which said lug rests; a scale carried on said frame; a pivotally mounted index sweeping said scale; and means coupling said index and said arm whereby the position of the index relative to the scale is related to the pitch of the saw being tested.

JOHN A. BRANTLEY.